US007080038B2

(12) United States Patent
Sansone

(10) Patent No.: US 7,080,038 B2
(45) Date of Patent: *Jul. 18, 2006

(54) METHOD AND SYSTEM FOR ACCEPTING NON-HARMING MAIL AT A HOME OR OFFICE

(75) Inventor: Ronald P. Sansone, Weston, CT (US)

(73) Assignee: Pitney Bowes Inc., Stamford, CT (US)

( * ) Notice: Subject to any disclaimer, the term of this patent is extended or adjusted under 35 U.S.C. 154(b) by 732 days.

This patent is subject to a terminal disclaimer.

(21) Appl. No.: 10/015,464

(22) Filed: Dec. 12, 2001

(65) Prior Publication Data

US 2003/0110135 A1    Jun. 12, 2003

(51) Int. Cl.
*G06F 17/60* (2006.01)
(52) U.S. Cl. ............................ 705/50; 705/406; 340/569
(58) Field of Classification Search ................ 382/101; 235/454; 715/500; 705/60, 406; 713/202; 340/569
See application file for complete search history.

(56) References Cited

U.S. PATENT DOCUMENTS

| | | | |
|---|---|---|---|
| 5,200,626 A | 4/1993 | Schultz et al. | |
| 5,440,136 A | 8/1995 | Gomberg | |
| 5,656,799 A | 8/1997 | Ramsden et al. | |
| 6,006,211 A | 12/1999 | Sansone et al. | 705/410 |
| 6,023,723 A | 2/2000 | McCormick et al. | |
| 6,028,517 A | 2/2000 | Sansone et al. | 340/569 |
| 6,032,138 A | 2/2000 | McFiggans et al. | 705/410 |
| 6,064,995 A | 5/2000 | Sansone et al. | 705/410 |
| 6,271,154 B1 | 8/2001 | Shen et al. | |
| 6,330,590 B1 | 12/2001 | Cotten | |
| 6,385,731 B1* | 5/2002 | Ananda | 726/6 |
| 6,404,337 B1 | 6/2002 | Till et al. | |
| 6,477,514 B1 | 11/2002 | Gil et al. | |
| 6,613,571 B1 | 9/2003 | Cordery et al. | |
| 6,789,727 B1 | 9/2004 | Felice et al. | |

(Continued)

FOREIGN PATENT DOCUMENTS

DE    10153420 A1    6/2002

(Continued)

OTHER PUBLICATIONS

Safe Mail Shelter Offers Safer Solution To Mailroom Conerns; Nov. 20, 2001; Business Wire.*

(Continued)

*Primary Examiner*—James P. Trammell
*Assistant Examiner*—Behrang Badii
(74) *Attorney, Agent, or Firm*—Ronald Reichman; Angelo N. Chaclas

(57) ABSTRACT

A method and system that enable the recipient of letters, flats and/or packages (hereinafter "mail") that are addressed to the recipient to determine the identity of the person or group that placed an indicia and other information on mail, i.e., the person or group who applied for a license to use the meter before the recipient opened the mail. The invention accomplishes the foregoing by: scanning mail in recipient's home or office that is addressed to the recipient which may contain material that may or may not be life-harming; capturing an image of the face of the mail, which includes the name and physical address of the recipient and the postal indicia; and processing the image on the face of the mail to identify the mailer and the mail to assess the possibility of the presence of life-harming material in the mail.

22 Claims, 14 Drawing Sheets

U.S. PATENT DOCUMENTS

| | | | |
|---|---|---|---|
| 6,842,742 B1* | 1/2005 | Brookner | 705/60 |
| 6,867,044 B1 | 3/2005 | Cordery et al. | |
| 2002/0079371 A1* | 6/2002 | Bobrow et al. | 235/454 |
| 2002/0124664 A1 | 9/2002 | Call et al. | |
| 2002/0141613 A1 | 10/2002 | Sansone | |
| 2003/0034874 A1 | 2/2003 | Mann | |
| 2003/0062414 A1 | 4/2003 | Tsikos et al. | |
| 2003/0072469 A1* | 4/2003 | Alden | 382/101 |
| 2003/0110144 A1 | 6/2003 | Sansone | |
| 2003/0136203 A1 | 7/2003 | Yoon | |
| 2005/0034055 A1* | 2/2005 | Rangan et al. | 715/500 |

FOREIGN PATENT DOCUMENTS

| | | |
|---|---|---|
| EP | 0609092 A2 | 1/1994 |
| EP | 1063602 A1 | 12/2000 |
| WO | WO 200127718 A2 * | 4/2001 |

OTHER PUBLICATIONS

U.S. Appl. No. 09/683,381, entitled Method and System for Notifying Mail Users of Mailpiece Contamination.

Unknown Author, "Scanna Mail", spring 2001, 5 pages.

"Mail Performation Paddle used during a Yellow Fever Epidemic", http://www.si.edu/postal/learnmore/paddle.html, Nov. 29, 2001, 2 pages.

"The bugs of war", Nature, vol. 411, May 17, 2001, 4 pages.

Pinnick, R.G., et al., "Real-time Measurement of Fluorescence Spectra from Single Airborne Biological Particles", 1999, 32 pages.

SKC BioSampler brochure, 4 pages.

Johnson-Winegar, A., et al., "The DoD Biological Detection Program, NDIA Roundtable Discussions", Oct. 24, 2000, 27 pages.

"Anthrax Detectors ar coming", Office of Naval Research, Oct. 29, 2001, 1 page.

Ocean Optics Brochure, Endospore Detection, Dec. 5, 2001, www.oceanoptics.com, 4 pages.

Shanker, M.S., "Instant anthrax detector developed in Hyderabad", Nov. 5, 2001, 1 page.

Introduction to Fluorescense Techniques with bibliography, Dec. 4, 2001, www.probes.com/handbook, 9 pages.

Cao, et al., DNA Nanoparticle Assembly and Diagnostics, Dec. 4, 2001, 2 pages.

Ocean Optics Portable Endoscope Detection System Offers Real-time Antrax Screening, Nov. 15, 2001, 1 page.

Scholl, et al., "Immunoaffinity-based phosphorescent sensor platform for the detection of bacterial spores", abstract Apr. 2000, 1 page.

"What is a Fluorometer?", Jul. 17, 2001, 1 page, http://response.restoration.noaa.gov/oilaids/SMART/SMART-tour/fluor.html.

Hargis, et al., "Ultraviolet fluorescence identification of protein, DNA and bacteria", abstract Feb. 1995, 1 page.

McMillan, "Point-of-care Real Time Molecular Detection of Infectious Agents" May 20, 2001, 2 pages.

"Cellomics, Inc. Announces the Development of Biowarfare Detection Methods", Nov. 21, 2001, www.prnewswire.com, 1 page.

"Lambda Technologies' Variable Microwave Systems Adapted to 'Zap ' Bioterrorism Threat", Nov. 5, 2001, www.prnewswire.com, 2 pages.

"Egea Awarded Second DARPA Contract to Fight Bioterrorism", Oct. 30, 2001, 1 page.

Meserve, J., "Feds, industry rush to make cheap biohazard detectors", Nov. 1, 2001, 1 page.

"Mathematical model provides new tool to asses mailbourne spread of anthrax" May 13, 2002, 2 pages.

"UMAss chemist working on sensors that could eventually identify bioterror agents", Dec. 13, 2001, 2 pages.

"Stickers warn of UV Radiation", May 23, 2000, 1 page.

"Simple and inexpensive, an artificial nose senses smell by seeing colors", Aug. 16, 2000, 1 page.

"Electronic Sniffer, Listen Hard and listen good if you want to name that smell", Dec. 19, 200, 1 page, www.newscientist.com.

E-nose noses out mines, Office of Naval Research, Apr. 17, 2001, 1 page.

"On a spot smaller than a dime, UB chemists print sensors that may detect hundreds of chemicals", Jan. 25, 2002, 2 pages.

"The Classica Group Files Patent Application for its Method of Sterilization Against Anthra Bacteria Disseminated on or in Paper", Oct. 26, 2001, businesswire, 1 page.

Gordon, M., "Companies accused of Anthrax Fraud", Nov. 15, 2001, 1 page.

"Sensors Detect Biological Weapons", www.photonics.com/content/Jan99/techWeapons.html, Jan. 1999, 4 pages.

Aston, C. , "Biological Warfare Canaries", IEEE Spectrum, Oct. 2001, 6 pages.

Murray, C., Biodetectors aim to broaden search for anthrax bacteria, Oct. 15, 2001, 5 pages.

"Biosensors and Biochips for Environmental and Biomedical Applications", www.ornl.gov/virtual/biosensors, Dec. 4, 2001, 2 pages.

"ID Mail Systems to Develop Mail Profiling System for in-bound Mail Centers Against Potential Threatening Mail", Oct. 18, 2001, 2 pages.

"Mailrooms on Front Lines in Bioterrorism Fight", Oct. 15, 2001, The Wall Street Journal, 1 page.

Vorenberg, S., "Sandia designs sensors to detect toxic chemicals in water", Oct. 12, 2001, www.abqtrib.com, 2 pages.

"Sandia's soil and groundwater chemical 'sniffer' may help protect the nation's water supply", Oct. 3, 2001, www.sandia.gov/media/NewsRel.NR2001/whtsniff.htm (4 pages).

"Two new Sandia 'sniffers' expand law enforcement abilities to detect explosives and narcotics", Nov. 30, 1999, www.sandia.gov/media/NewsRel.NR1999/sniffers.htm (4 apges).

"Aviation Safety Report", David Barnes, Traffic World, p. 8, Feb. 17, 1997.

* cited by examiner

US 7,080,038 B2

METHOD AND SYSTEM FOR ACCEPTING NON-HARMING MAIL AT A HOME OR OFFICE

CROSS REFERENCE TO RELATED APPLICATIONS

Reference is made to commonly assigned co-pending patent applications: Ser. No. 10/015,309 filed Dec. 12, 2001, entitled "System For Accepting Non-Harming Mail At A Receptacle" in the name of Ronald P. Sansone; Ser. No. 10/015,376 filed Dec. 12, 2001, entitled "System For Accepting Non-Life-Harming Mail From People Who Are Authorized To Deposit Mail In A Receptacle" in the name of Ronald P. Sansone; and Ser. No. 10/015,423 filed Dec. 12, 2001, entitled "Method And System For Accepting Non-Toxic Mail That Has An Indication Of The Mailer On The Mail" in the name of Ronald P. Sansone; and Ser. No. 10/015,469 filed Dec. 12, 2001, entitled "System For A Recipient To Determine Whether Or Not They Received Non-Life-Harming Materials" in the name of Ronald P. Sansone.

FIELD OF THE INVENTION

The invention relates generally to the field of mail delivery systems and, more particularly, to methods that detect the presence of life harming materials.

BACKGROUND OF THE INVENTION

People have used the United States Postal Service (USPS) and other courier services, e.g., Federal Express®, Airborne®, United Parcel Service,® DHL®, etc., hereinafter called "carriers", to deliver materials to recipients to whom the sender does not want to deliver personally. Unfortunately, sometimes the delivered materials may be illegal and/or hazardous to the health of the recipient and to the party who is delivering the goods, e.g. life-harming. Examples of life-harming materials are explosives; gun powder; blasting material; bombs; detonators; smokeless powder; radioactive materials; ammunition; atomic weapons; chemical compounds or any mechanical mixture containing any oxidizing and combustible units, or other ingredients in such proportions, quantities, or packing that ignite by fire, friction, concussion, percussion or detonation of any part thereof which may and is intended to cause an explosion; poisons; carcinogenic materials; caustic chemicals; hallucinogenic substances; illegal materials; drugs that are illegal to sell and/or dispense; and substances which, because of their toxicity, magnification or concentration within biological chains, present a threat to biological life when exposed to the environment, etc.

Soon after the Sep. 11, 2001, terrorist attack on the United States, someone and/or a group of people has been adding harmful biological agents to the mail. The addition of harmful biological agents to the mail submitted to the USPS has caused the death of some people and necessitated the closure of some post offices and other government office buildings. Thus, there is an urgent need to exclude life-harming materials that are included in the mail.

SUMMARY OF THE INVENTION

This invention overcomes the disadvantages of the prior art by providing a system that enables the recipient of letters, flats and/or packages (hereinafter "mail") that are addressed to the recipient to determine the identity of the person or group that placed an indicia and other information on mail, i.e., the person or group who applied for a license to use the meter, before the recipient opened the mail. The recipient would also be able to determine the identity of mailers who placed mail in receptacles designed to exclude life-harming mail. The identity of the mailing would also be uniquely identified. Since the identity of the mailer and specific item being mailed to the recipient would be known, the recipient would have some assurance that the mail does not contain life harming materials before opening the mail. Hence, the recipient would not have to open mail that may cause human harm and/or extensive property damage.

This invention accomplishes the foregoing by scanning delivered mail in recipient's home or office that is addressed to the recipient which may contain material that may or may not be life-harming; capturing an image of the face of the mail, which includes the name and physical address of the recipient and the postal indicia; and processing the image on the face of the mail to identify the mailer and the mail to access the possibility of the presence of life harming material in the mail.

DETAILED DESCRIPTION OF THE PREFERRED EMBODIMENT

Figure 1:
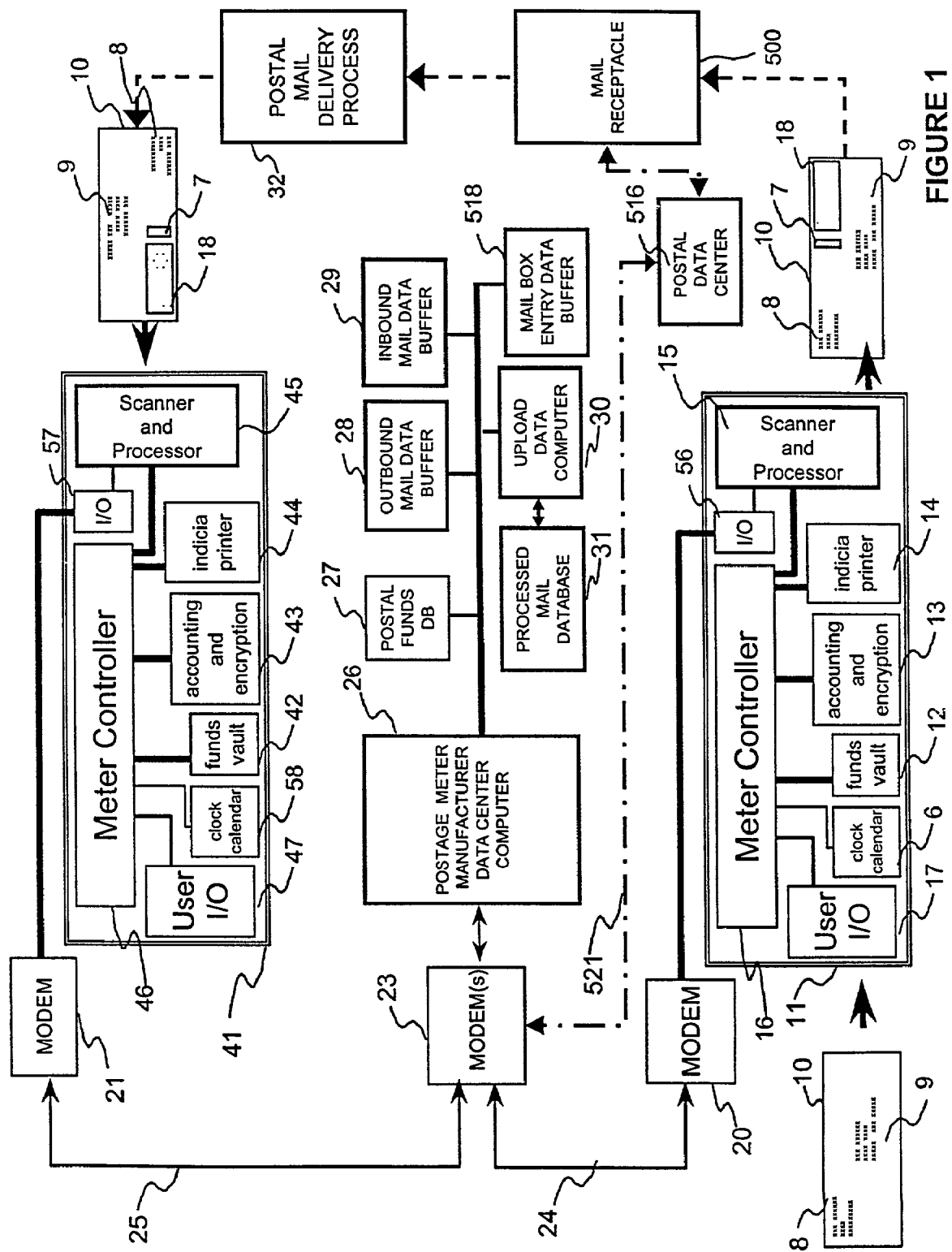
FIG. 1 is a block diagram of this invention.

Referring now to the drawings in detail, and more particularly to FIG. 1, the reference character 11 represents an electronic postage meter. Postage meter 11 includes a funds vault 12 that represents the value of the postage that may be used by meter 11; an accounting and encryption module 13 that contains information that is used to print indicia 18; a printer 14; a scanner and processor 15; a controller 16; a clock and calendar 6; a user I/O 17; and an I/O 56. Accounting and encryption module 13 obtains a security code that may be obtained from address field 9 of mail piece 10 and information contained in postage meter 11. The manner in which the aforementioned security code is obtained is disclosed in the Sansone, et al. U.S. Pat. No. 4,831,555 entitled "Unsecured Postage Applying System" herein incorporated by reference. User I/O 17 comprises a keyboard in which an operator may enter information into meter 11 and a display in which an operator of meter 11 may read information about meter 11. Funds vault 12, accounting and encryption module 13, indicia printer 14, scanner and processor 15, clock and calendar 6, and user I/O 17 are coupled to controller 16. Clock and calendar 6 provides an internal source of time and date for controller 16. Thus, clock and calendar 6 will supply the instant date and time that meter 11 affixed the indicia to mail piece 10. Scanner and processor 15 will store the above information in processed mail data buffer 54 (described in the description of FIG. 3A)

Actions performed by meter 11 are communicated to controller 16. Controller 16 controls the actions of postage meter 11. Clock and calendar 6 also permits controller 16 to store the date and time that postal indicia 18 was affixed to mail piece 10. Controller 16 uses the weighing of the mail piece to determine the correct postage, and causes meter 11 to affix the correct postage to the mail piece. Controller 16 is described in Wu's U.S. Pat. No. 5,272,640 entitled "Automatic Mail-Processing Device With Full Functions" herein incorporated by reference.

The user of meter 11 places the mail piece to be mailed on a scale (not shown) and enters the classification of the material to be mailed, i.e., first class mail, standard mail, parcel post, etc., into the keyboard of user I/O 17, and relevant information regarding the object to be mailed is displayed on the display of user I/O 17.

Printer 14 will print postal indicia 18 on mail piece 10. Scanner and processor 15 scans address field 9 and sender return address field 8 of mail piece 10. Then, scanner and processor 15 segments the information contained in fields 8 and 9 and stores the segmented information, i.e., tracking code 7. Tracking code 7 may be similar to or the same as the security code determined by accounting encryption module 13. For instance, a unique tracking number may be composed by assembling a number that includes the meter number, the date of mailing of the mail piece, the time of day, the postage placed on the mail piece, the zip code of the licensee of the meter, the name, address, city, state and zip code of the sender of the mail piece, and the name address, city, state and zip code of the recipient of the mail piece. It will be obvious to one skilled in the art that any combination of the aforementioned variables may be used if the meter number is included. In the United States, meter manufactures identify their meters by one or two alpha characters before the meter number. It will also be obvious to one skilled in the art that many other variables may be used to produce unique tracking numbers.

I/O 56 is coupled to modem 20 and scanner and processor 15. Modem 23 is coupled to modem 20 via communications path 24, and modem 21 is coupled to modem 23 via communications path 25. Modem 23 is coupled to postage meter manufacturer data center computer 26. Modem 23 is coupled to postal data center 516 via communications path 521. Computer 26 manages the day-to-day operation of its postage meters metering i.e., installing new postage meters, withdrawing postage meters, and refilling postage meters with customer funds.

Computer 26 is coupled to postal funds data base 27. Data base 27 stores postal funds that have been used and credited to meters 11 and 41. Computer 26 is also coupled to outbound mail data buffer 28 that receives information about mail piece 10 from postage meter 11, i.e., tracking number 7 and address field 9; inbound mail data buffer 29 that receives information about mail piece 10 from postage meter 41, i.e., tracking number 7 and address field 9; mail box entry data buffer 518 that buffers the scanned data from receptacle 500 (FIG. 2), and upload data computer 30 that receives and processes information from buffers 28 and 29. Processed mail data base 31 is coupled to upload data computer 30. Processed mail data base 31 stores the result of the output of computer 30 and makes it available to computer 26 for transmission to meter 11.

Postage meter 41 includes a funds vault 42 that represents the value of the postage that may be used by meter 41; an accounting and encryption module 43 that contains information that is used to print postal indicium; a printer 44; a scanner and processor 45; a controller 46; a clock and calendar 58 that permits controller 46 to store the date and time that scanner 45 scanned mail piece 10; a user I/O 47; and an I/O 57. Funds vault 42, accounting and encryption module 43, indicia printer 44, scanner and processor 45, and user I/O 47 are coupled to controller 46. I/O 57 is the interface between scanner and processor 45 and modem 21, and is used to upload data from meter 41 to computer 26 via modems 21 and 23. Clock and calendar 58 will supply the instant date and time that scanner 45 reads mail piece 10. The above information will be stored in processed mail data buffer 54 of FIG. 3A.

Thus, meter 41 is the same as meter 11. In this example, meter 41 is being used as the receiving meter, and meter 11 is being used as a sending meter. It will be obvious to those skilled in the art that meter 11 may be a receiving meter, and meter 41 a sending meter and that additional meters may be connected to computer 26.

After indicia 18 is affixed to mail piece 10 by postage meter 11, mail piece 10 is placed in slot 507 (FIG. 2) before it enters control chamber 510 and inner chamber 514 of receptacle 500. Mail deposited in inner chamber 514 of receptacle 500 will subsequently enter USPS mail delivery process 32 (FIG. 1). The description and operation of receptacle 500 is described in the description of FIG. 2. Mail may enter postal delivery process 32 by other entry means, i.e., a normal mail box, at the postal counter, etc. The post delivers mail piece 10 to the owner of electronic postage meter 41. Mail piece 10 will be scanned by scanner and processor 45 of meter 41. Scanner and processor 45 segments the data and stores it for uploading to computer 26 via modems 21 and 23. Information from meter 11 regarding mail piece 10 was previously sent to computer 26 via modems 20 and 23. The information transmitted by meter 11 is tracking number 7, address field 8 and address field 9. The information transmitted by meter 41 to data center computer 26 is tracking number 7, return address field 8 and address field 9, the date and time mail piece 10 was scanned by meter 41, and the serial number of meter 41. Computer 26 will confirm whether or not the above data is in outbound mail data buffer 28 (FIG. 1). If the data is not in outbound mail data buffer 28, computer 26 will request postal data center 516 to check special stamps data base 540 and identification card data base 541 (FIG. 9) to determine the identity of the person or group who was issued the special stamps or identification card. Postal data center 516 will inform meter 41 of the results of its determination. The results of the determination are described in the description of FIG. 9.

Figure 2:
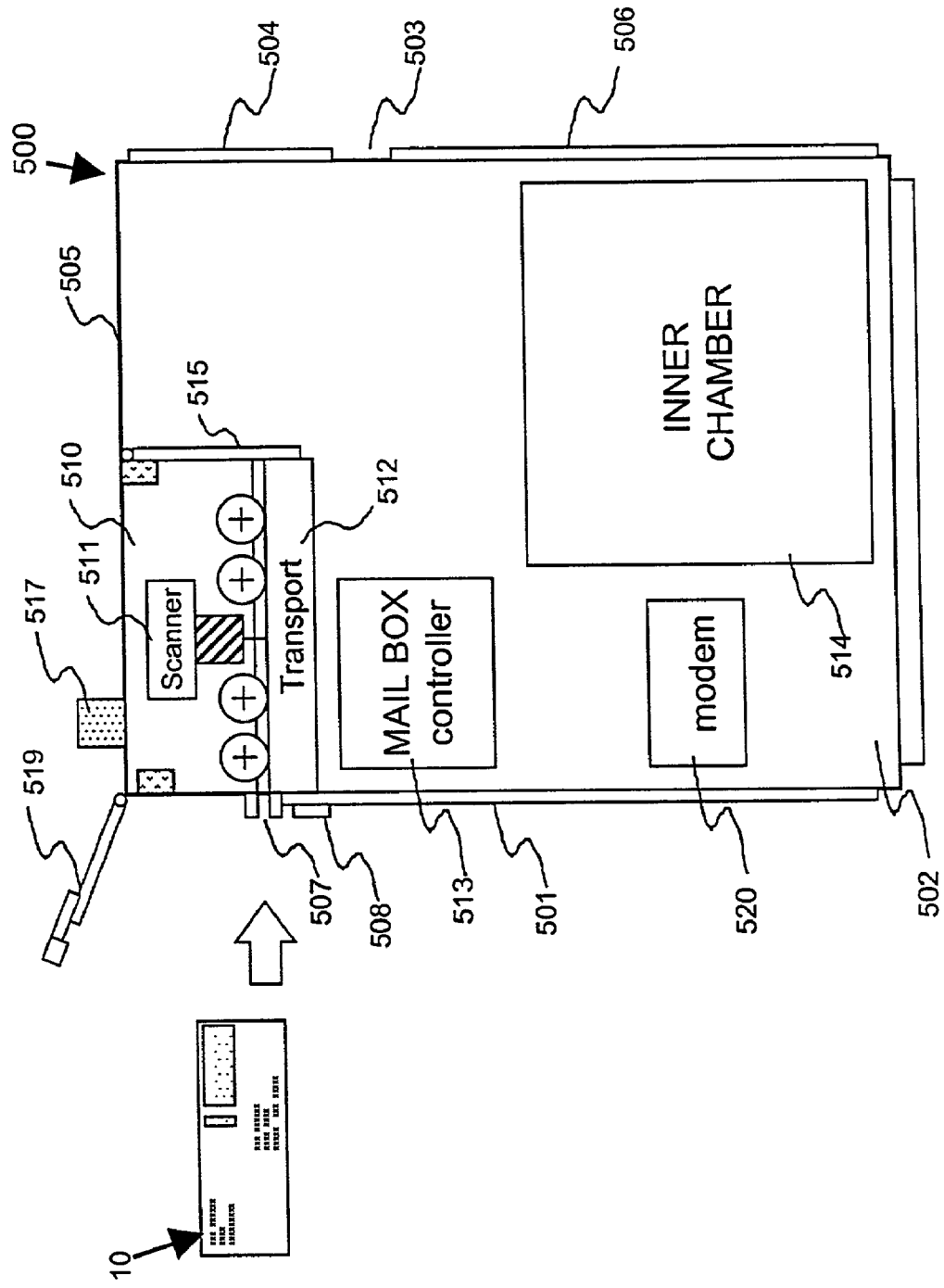
FIG. 2 is a drawing of receptacle 500 of FIG. 1 in greater detail.

FIG. 2 is a drawing of mail receptacle 500 of FIG. 1. Receptacle 500 has a front panel 501 containing a slot 508 for receptacle identification cards 600 and 610 (FIGS. 11A and 11B, respectively) and a mail slot 507 for depositing mail; a top panel 505; side panels 502; a back panel 503 having a door 504 for access to life-harming materials; and, a door 506 for access to non-life-harming materials. Receptacle 500 has a control chamber 510 that contains a scanner 511 and a transport 512. Card 600 or card 610 is placed in slot 508 and transported by transport 512 to scanner 511 so that scanner 511 may read the information on the card. Then, transport 512 ejects card 600 or card 610 through slot 508. When mail and/or mail piece 10 (FIG. 1) is deposited face up in slot 507, mail piece 10 will enter control chamber 510. The face of mail piece 10 will be scanned and read by scanner 511 while being moved by transport 512. Mail box 513 will interpret the foregoing information regarding mail piece 10. Controller 513 will communicate with postal data center 516 (FIG. 1) via data buffer and modem 520. Postal data center 516 communicates with computer 26 (FIG. 1) which accesses buffer 29 to determine if a record of the mail currently in control chamber 510 appears in buffer 29.

If the information on the face of the mail piece in control chamber 510 does not match the information in buffer 29, the mail in control chamber 510 is of questionable origin and may be suspected of having life-harming material. The mail will remain in control chamber 510, and a signal will be sent by controller 513 to postal data center 516 (FIG. 1) to inform the proper authorities to unlock door 504, remove the possibly tainted mail and activate door 519 to close slot 507 to prevent any mail from entering chamber 510. Controller 513 will also activate LED 517, which will indicate "Out Of Service" or "May contain life-harming materials", etc.

If the information on the face of the mail piece in control chamber 510 matches the information in buffer 29, the mail in control chamber 510 is not of questionable origin and is not suspected of having life harming material. The information will be stored in buffer 518 (FIG. 1), and computer 26 will authorize controller 513 to open door 515 and enable transport 512 to move the mail in control chamber 510 to inner chamber 514. Mail piece 10 and the other mail in inner chamber 514 may be removed by opening locked door 506.

Figure 3A:
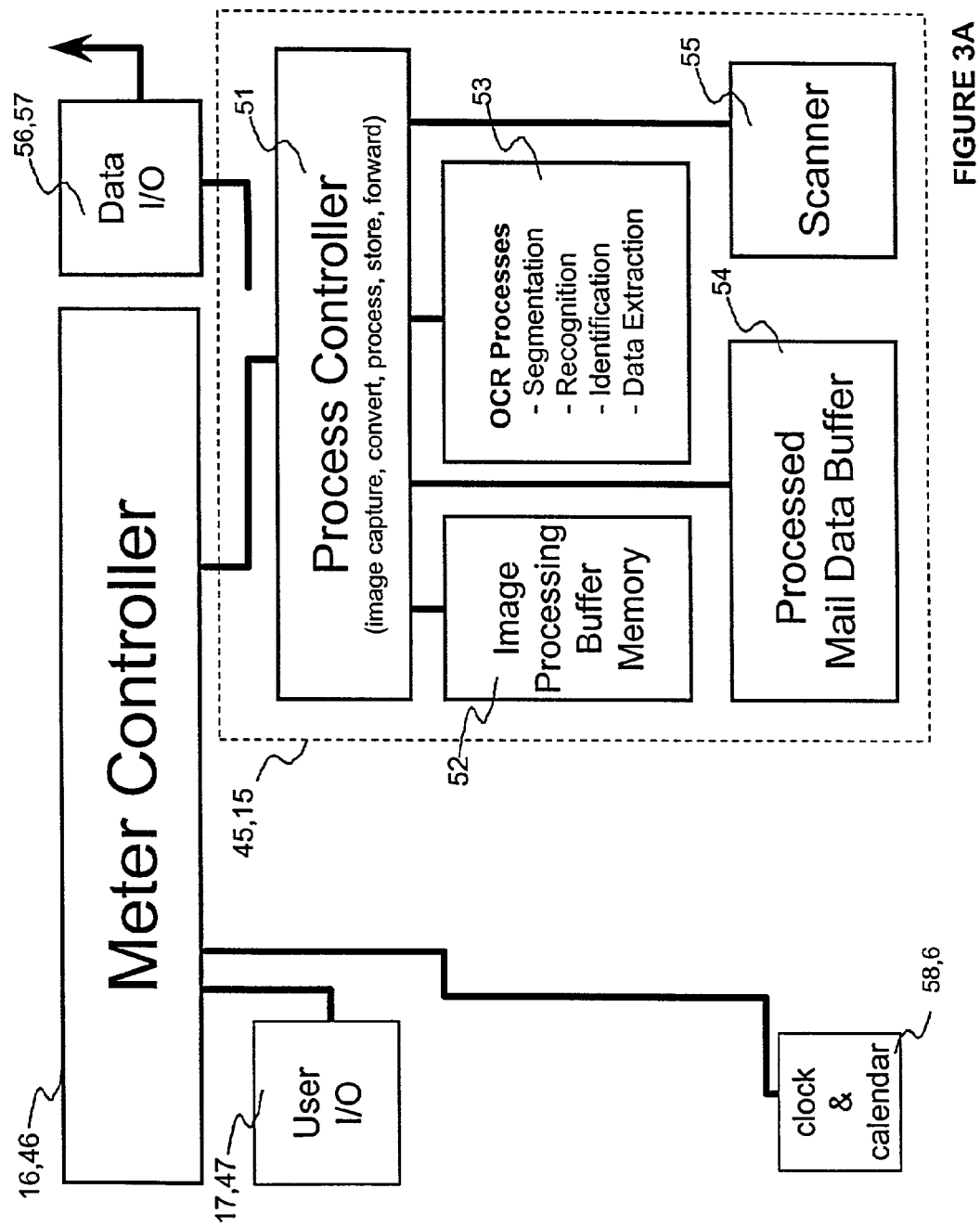
FIG. 3A is a drawing of scanner and data processors 15 and 45 of FIG. 1 in greater detail.

FIG. 3A is a drawing of scanner and data processors 15 and 45 of FIG. 1 in greater detail. The operator of meter 41 may use user I/O 47 to select the meter mode to place a postal indicia on mail piece 10 or the scan mode to read the postal indicia on mail piece 10. When the operator of meter 41 selects the scan mode, controller 46 turns control of meter 41 over to scan process controller 51. Mail piece 10 will be moved under scanner 55 and transported through meter 41 (not shown). Scanner 55 will store the image of mail piece 10 in image processing buffer memory 52, convert the image by using the process mentioned in OCR processes 53 and store the processed image in processed mail data buffer 54. Then, the optical character recognition process 53 will begin. Process 53 will segment the image into its various components, i.e., amount of postage, meter number, date mail piece 10 mailed, place mail piece 10 mailed, security code 89 (FIG. 4), tracking number 7, recipient address 9, and return address 8, etc. At this point, a recognition process will take the segmented components of the aforementioned image and convert them into an ASCII text field. In the identification process, it will be determined whether or not the ASCII information is in the correct format. Now the extracted information will be placed in processed mail data buffer 54. Clock and calendar 58 will be used to determine when mail piece 10 was scanned, and /data I/O 57 will be used to convey the information stored in buffer 54 to modem 21 at predetermined times.

The operator of meter 11 may use user I/O 17 to select the meter mode to place a postal indicia on mail piece 10, or the scan mode to read the postal indicia on mail piece 10. When the operator of meter 11 selects the meter mode, controller 16 turns control of meter 11 over to meter process controller 51. While mail piece 10 is being printed, it is scanned by scanner 55.

Scanner 55 will store the image of mail piece 10 in buffer 52, while mail piece 10 is being printed by meter 11. Scanner 55 will also convert the image by using the process shown in block 53 and store the processed image in mail data buffer 54. Then, the optical character recognition process 53 will begin. Process 53 will segment the image into its various components, i.e., amount of postage, meter number, date mail piece 10 mailed, place mail piece 10 mailed, security code 89, tracking number 7, recipient address 9, and return address 8, etc. At this point, the recognition process will take the segmented components of the aforementioned image and convert them into an ASCII text field. In the identification process, it will be determined whether or not the ASCII information is in the correct format. Now the extracted information will be placed in processed mail data buffer 54. Clock and calendar 6 will be used to note when an indicia was affixed to mail piece 10 and when mail piece 10 was scanned. Data I/O 56 will be used to convey the information stored in buffer 54 to modem 20 at a predetermined time.

Figure 3B:
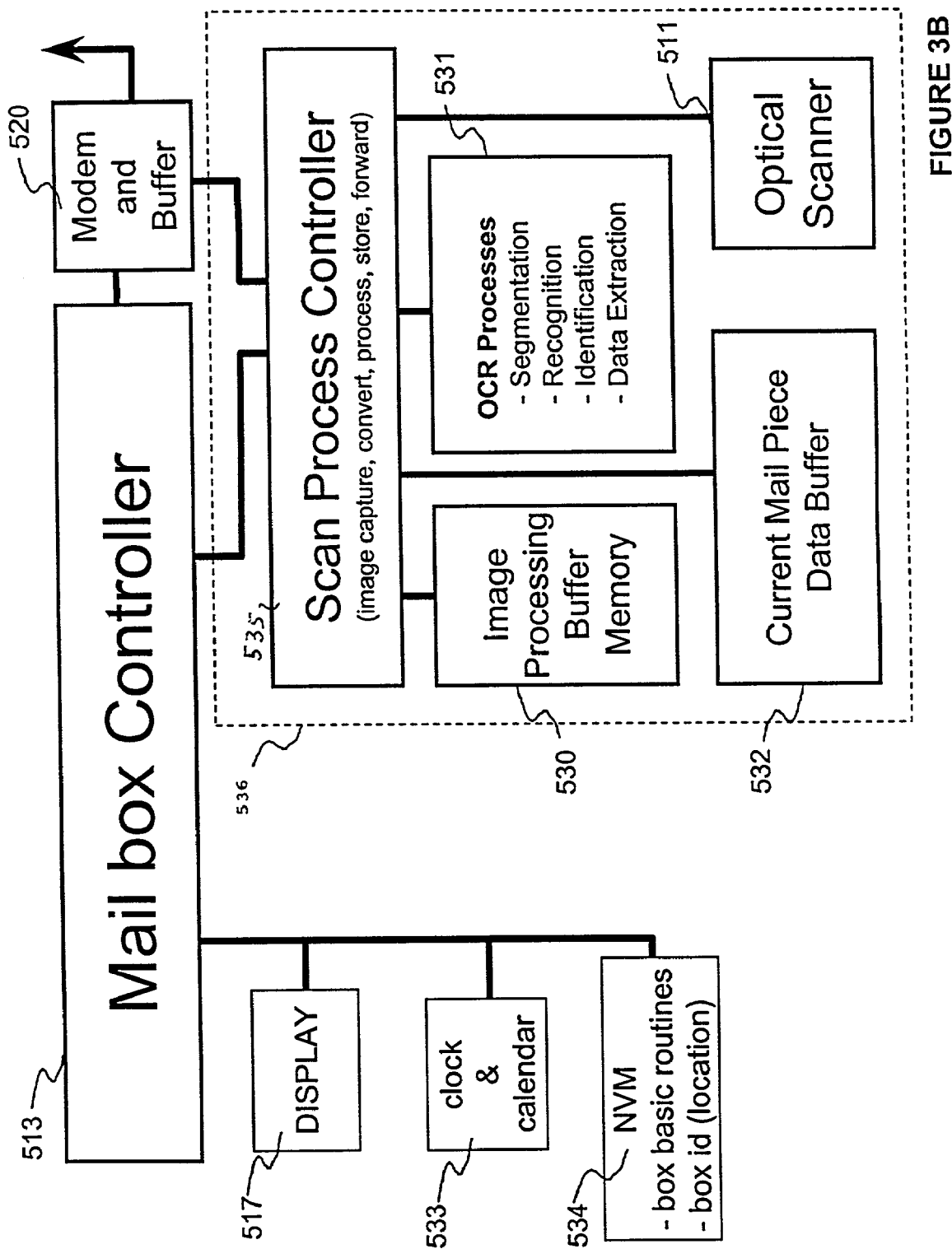
FIG. 3B is a drawing of mail box controller 513 of FIG. 2 in greater detail.

FIG. 3B is a drawing of mail box controller 513 of FIG. 2 in greater detail. Controller 513 may be activated when a piece of mail is properly inserted into slot 507. Controller 513 turns control over to process 536. Process 536 begins at scan process controller 535. Mail piece 10 will be moved under scanner 511 and transported control chamber 510 (FIG. 2). Scanner 511 will store the image of mail piece 10 in image processing buffer memory 530, convert the image by using the process mentioned in OCR processes 531 and store the processed image in image processing buffer memory 530. Then, the optical character recognition process 531 will begin. Process 531 will segment the image into its various components, i.e., amount of postage, meter number, date mail piece 10 mailed, place mail piece 10 mailed, security code 89 (FIG. 4), tracking number 7, recipient address 9, and return address 8, etc. At this point, a recognition process will take the segmented components of the aforementioned image and convert them into an ASCII text field. In the identification process, it will be determined whether or not the ASCII information is in the correct format. Now the extracted information will be placed in current mail piece data buffer 532. Clock and calendar 533 will be used to determine when mail piece 10 was scanned, and data buffer and modem 520 will be used to convey the information stored in current mail piece data buffer 532 to postal data center 516 (FIG. 1) at predetermined times.

Postal data center 516 sends the above mail data to computer 26, and, in turn, computer 30 validates the above data in buffer 28. Upload data computer 30 informs computer 26, which in turn informs postal data center 516 whether or not the above data was stored in buffer 28. If the data was stored in buffer 28, the mail is not suspect and is allowed to enter inner chamber 514 (FIG. 2) of receptacle 510. If the data was not stored in buffer 28, the mail is suspect and is not allowed to enter inner chamber 514 of receptacle 510. Postal data center 516 communicates the above to controller 513 via modem 520. If the mail is suspect, mail box controller 513 will activate display 517 and activate door 519 (FIG. 2) to close slot 507.

Figure 4:
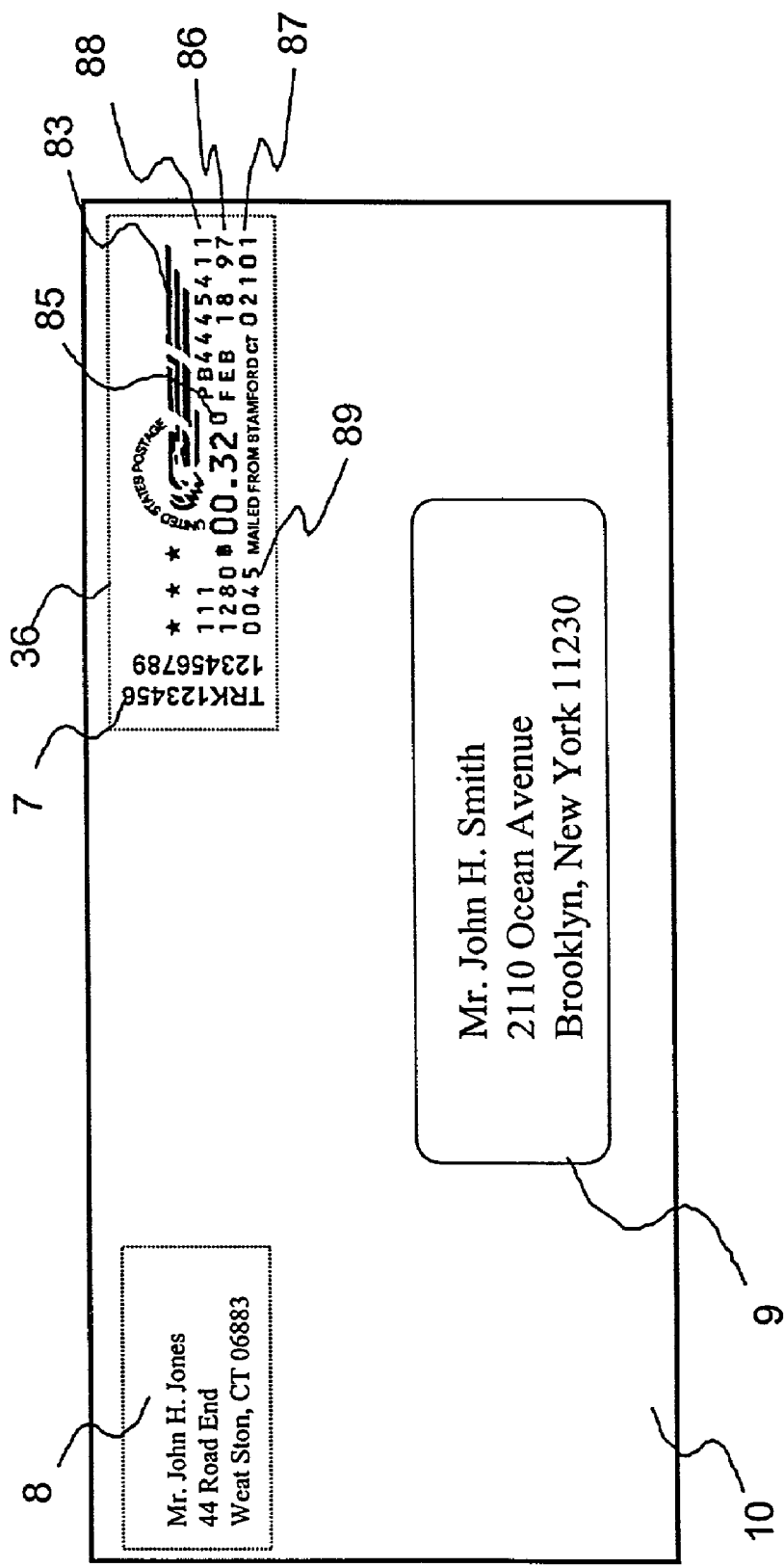
FIG. 4 is a drawing of a mail piece containing a postal indicia that was affixed by an electronic meter.

FIG. 4 is a drawing of a mail piece containing a postal indicia that was affixed by an electronic meter. Mail piece 10 has a recipient address field 9 and a sender address field 8. A postal indicia 36 is affixed to mail piece 10. Indicia 36 contains a dollar amount 85; the date 86 that postal indicia 36 was affixed to mail piece 10; the place 87 that mail piece 10 was mailed; the postal meter serial number 88; an eagle 83; a security code 89; and, a tracking number 7. Security code 89 and tracking number 7 are unique numbers that are derived from address field 9 and information contained in the postage meter that affixed indicia 36. The manner in which security code 89 and tracking number 7 are obtained is disclosed in the Sansone, et al. U.S. Pat. No. 4,831,555 entitled "Unsecured Postage Applying System" herein incorporated by reference.

Figure 5:
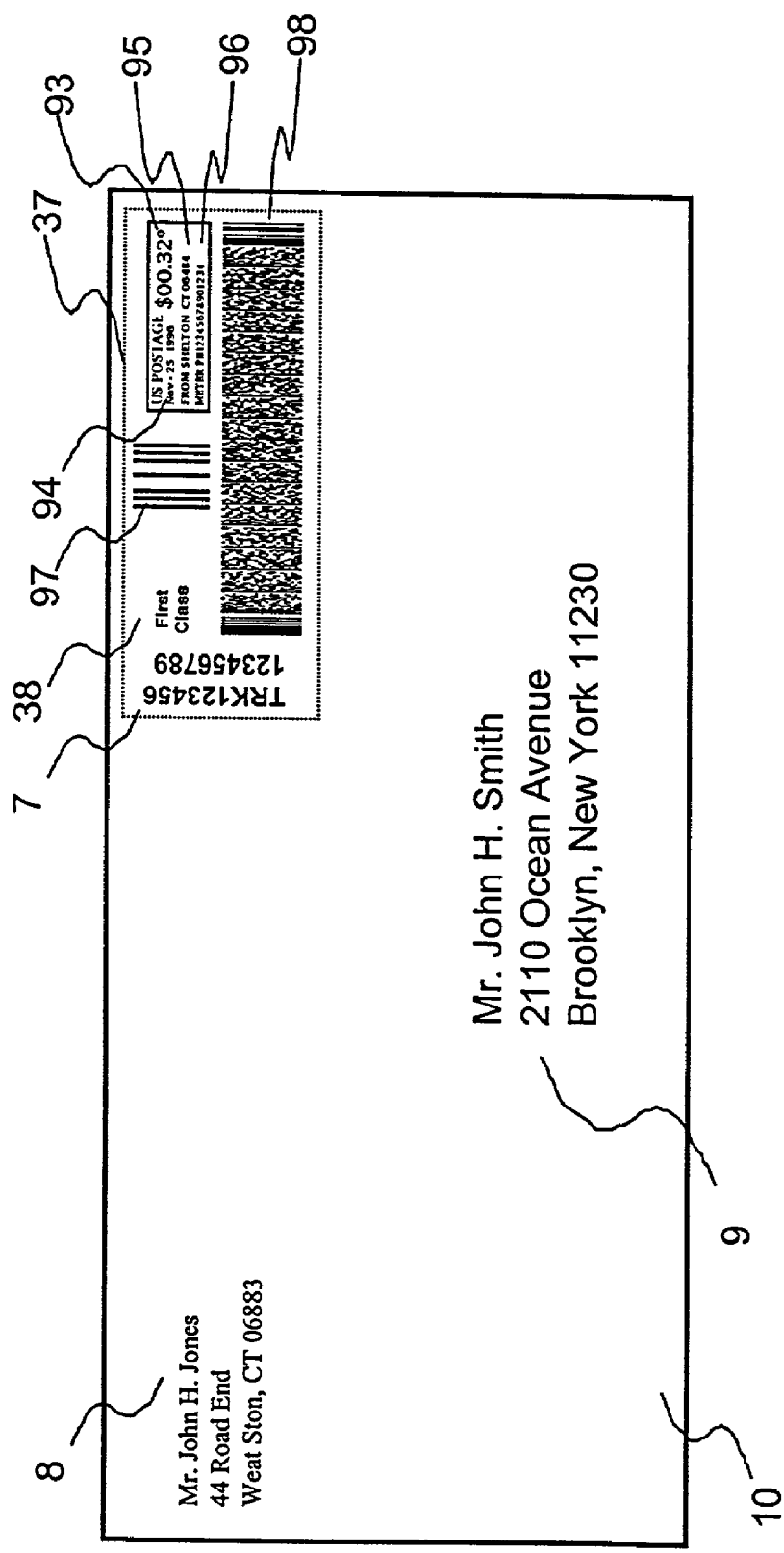
FIG. 5 is a drawing of a mail piece containing an Information-Based Indicia.

FIG. 5 is a drawing of a mail piece 10 containing an indicia 37. Mail piece 10 has a recipient address field 9 and a sender address field 8. Mail piece 10 contains United States Postal Service (USPS) Information-Based Indicia (IBI) 37. The USPS Engineering Center recently published a notice of proposed specification that describes an Information-Based Indicia. The postal indicia 37 contains a dollar amount 93; the date 94 that the postal indicia was affixed to mail piece 10; the place 95 that mail piece 10 was mailed; the postal security device serial number 96; a FIM code 97; a 2D encrypted bar code 98; and, a tracking number 7. Serial number 96 may be derived from bar code 98 or be equal to bar code 98. Bar code 98 is a unique number that is derived from address field 9 and information contained in the postal security device that affixed IBI 37. The manner in which information contained in bar code 98 is obtained is disclosed in the Sansone, et al. U.S. Pat. No. 4,831,555 entitled "UNSECURED POSTAGE APPLYING SYSTEM," herein incorporated by reference. Mail piece 10 also contains an indication 38 of the class of mail piece 10.

Figure 6:
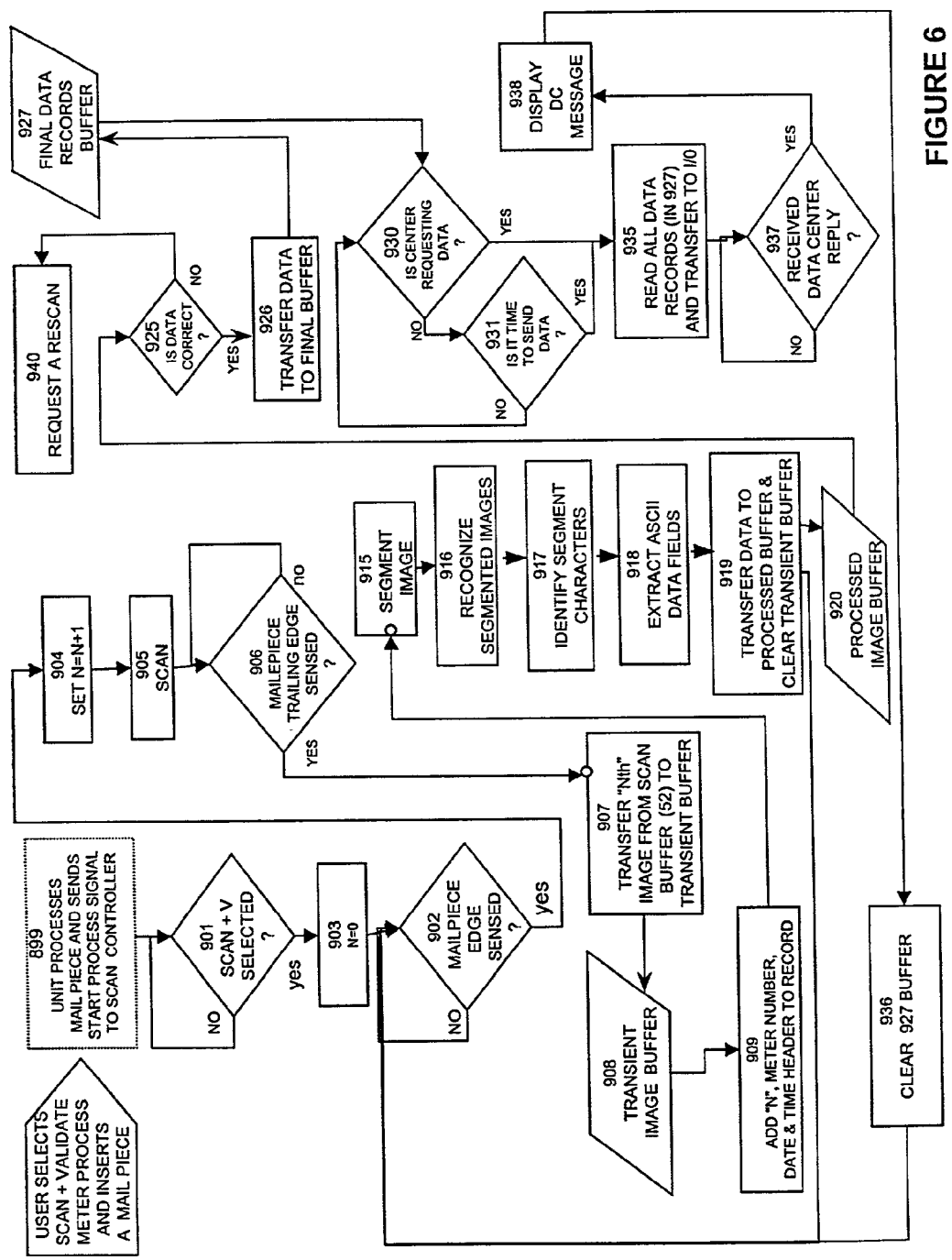
FIG. 6 is a drawing of a flow chart of the scan/upload process.

FIG. 6 is a drawing of a flow chart of the scan/upload process for the meter and the PSD. The user selects the scan process and inserts a mail piece for the meter. For the receiving PSD 342 (FIG. 7) the user selects the scan process and inserts a mail piece into scanner and processor 345. Block 899 processes the mail piece and sends a start process signal to the scan controller. This process is used by meter controller 46 of FIG. 1. Then the program goes to block 901. Block 901 determines whether or not the scan mode has been selected. If the scan mode has not been selected, then the program goes back to block 901. If the scan mode has been selected, the program goes to block 903 and sets N=0. Then the program goes to decision block 902. Block 902 determines whether or not the edge of mail piece 10 has been sensed. If the edge of mail piece 10 has not been sensed, then the program goes back to block 902. If the edge of mail piece 10 has been sensed, then the program goes to block 904 to set N=N+1, where N is a piece count of the image of a mail piece.

Now the program goes to block 905 to scan mail piece 10. At this point, the program goes to decision block 906. Block 906 determines whether or not the trailing edge of mail piece 10 has been sensed. If the trailing edge of mail piece 10 has not been sensed then the program goes back to block 906. If the trailing edge of mail piece 10 has been sensed, then the program goes to block 907. Block 907 transfers the Nth image from the scan buffer block 52 to the transient image buffer block 908. Then, in block 909, the program adds the N, piece count of the image of the mail piece meter number, date and time to the header for the record. Then the program goes to block 915 to segment the image. Then the program goes to block 916 to recognize segmented images. In block 917, the program identifies the segmented characters. Now the program goes to block 918 to extract ASCII data fields. At this point, the program goes to block 919 to transfer the data to processed image buffer block 920 and clear transient buffer. Now the program goes to decision block 902. Then the program goes to decision block 925. Block 925 determines whether or not the data is correct. If the data is incorrect, the program goes to block 940 to request a rescan. If the data is correct, the program goes to block 926 to transfer the data to the final buffer. Then the program goes to final data records buffer block 927. At this point, the program goes to decision block 930. Decision block 930 determines whether or not data center computer 26 is requesting data. If block 930 determines that computer 26 is not requesting data, the program goes to decision block 931. Decision block 931 determines whether or not it is time to send data. If block 931 determines that it is time to send data, the program goes to block 935. If block 931 determines that it is not time to send data, the program goes back to the input of block 930. If block 930 determines that computer 26 is requesting data, then the program proceeds to block 935. Block 935 reads all final data records in block 927 and transfers them to I/O 56, 57 (FIG. 1) or 347 (FIG. 7).

Now the program goes to decision block 937. Decision block 937 determines whether or not data centers 26 (FIG. 1) or 326 (FIG. 7) have received a validation message. If block 937 determines that a validation message has not been received, the program goes back to the input of block 937. If block 937 determines that a validation message has been received, the program goes to block 938 to display the message on I/O 56, 57 or 347. Then the program goes to block 936 to clear final data buffer records block 927. At this point, the program goes back to decision block 902.

Figure 7:
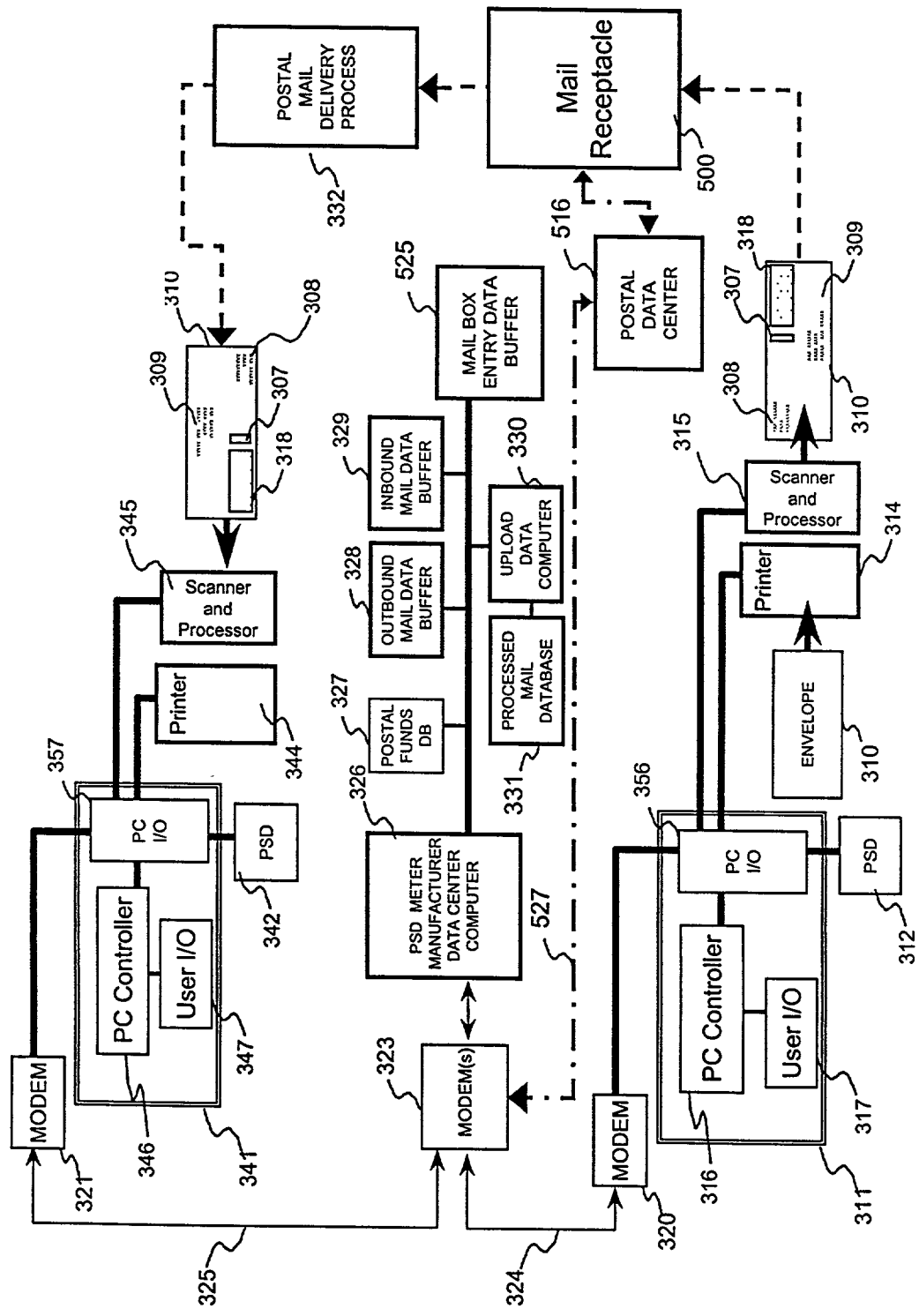
FIG. 7 is a block diagram of a PSD-based PC mailing system.

FIG. 7 is a block diagram of a PSD-based PC mailing system. Personal computer (PC) 311 includes a PC controller 316; a user I/O 317; and a PC I/O 356. PSD 312 obtains a security code that may be obtained from address field 309 of mail piece 310 and information contained in PC 311. User I/O 317 comprises a keyboard in which an operator may enter information into PC 311, and a display in which an operator of PC 311 may read information about PC 311. A clock and calendar inside PSD 312 will supply the instant date and time that printer 314 affixed the indicia to mail piece 310. Scanner and processor 315 will store the above information in PC 311.

Actions performed by PC 311 are communicated to controller 316. Controller 316 controls the actions of PC 311. Controller 316 uses the weighing of the mail piece to determine the correct postage, and enables printer 314 to affix the correct postage to mail piece 310.

The user of PC 311 places the mail piece to be mailed on a scale (not shown) and enters the classification of the material to be mailed, i.e., first class mail, second class mail, parcel post, etc., into the keyboard of I/O 317, and relevant information regarding the object to be mailed is displayed on the display of I/O 317.

Printer 314 will print postal indicia 318 on mail piece 310. Scanner and processor 315 scans address field 309 and sender return address field 308 of mail piece 310. Then scanner and processor 315 segments the information contained in fields 308 and 309 and stores the segmented information i.e., tracking code 307. Tracking code 307 may be similar to or the same as the security code determined by PSD 312. It will be obvious to one skilled in the art that there are many different methods to produce unique tracking numbers.

PC I/O 356 is coupled to modem 320 and scanner and processor 315. Modem 323 is coupled to modem 320 via communications path 324, and modem 321 is coupled to modem 323 via communications path 325. Modem 323 is coupled to PSD meter manufacturer data center computer 326. Modem 323 is coupled to postal data center 516 via communications path 527. Computer 326 manages the day to day operation of its PSD's metering, i.e., installing new PSD's, withdrawing PSD's, and refilling PSD's with customer funds.

Computer 326 is coupled to postal funds data base 327. Data base 327 stores postal funds that have been used and credited to PC 311 and 341. Computer 326 is also coupled to outbound mail data buffer 328 that receives information about mail piece 310 from PC 311 i.e., tracking number 307 and address field 309; inbound mail data buffer 329 that receives information about mail piece 310 from PC 341, i.e., tracking number 307 and address field 309; mail box entry data buffer 525 that buffers scanned data from receptacle 500; and upload data computer 330 that receives and processes information from buffers 328 and 329. Processed mail data base 331 is coupled to upload data computer 330. Processed mail data base 331 stores the result of the output of computer 330 and makes it available to computer 326 for transmission to PSD 311.

PSD 341 includes a PC controller 346; user I/O 347; and PC I/O 357. PSD 342 is coupled to PC I/O 357. PC I/O 357 is coupled to modem 321, and modem 321 is coupled to modem 323 via path 325. Scanner and processor 345 is coupled to PC I/O 357, and printer 344 is coupled to PC I/O 357. PSD 342 will supply the instant date and time that scanner 345 reads mail piece 310. The above information will be stored in PC 311.

Thus, PC 341 is the same as PC 311. In this example, PC 341 is being used as the receiving PC, and PC 311 is being used as a sending PC. It will be obvious to those skilled in the art that PC 311 may be a receiving PC and PC 341 a sending PC, and that additional PC's may be connected to computer 326.

After indicia 318 is affixed to mail piece 310 by PC 311, mail piece 310 is placed in slot 507 (FIG. 2) before it enters inner chamber 514 of receptacle 500. Mail deposited in inner chamber 514 of receptacle 500 will subsequently enter postal mail delivery process 332. The description and operation of receptacle 500 is described in the description of FIG. 2. Mail may enter postal mail delivery process 332 by other entry means, i.e., a normal mail box, at the postal counter, etc. Then mail piece 310 enters postal mail delivery process 332. The post delivers mail piece 310 to the owner of PC 341. Mail piece 310 will be scanned by scanner and processor 345 of PC 341. Scanner and processor 345 segments the data and stores it for uploading to computer 326 via modems 321 and 323. Information from PC 311 regarding mail piece 310 was previously sent to computer 326 via modems 320 and 323. The information transmitted by PC 311 is tracking number 307 and address field 309. The information transmitted by PC 341 to data center computer 326 is tracking number 307 and address field 309, the date and time mail piece 310 was scanned by PC 341 and the serial number of PC 341. Data center computer 26 will confirm whether or not the above data is in outbound mail data buffer 328. If the data is not in data buffer 328, computer 326 will request postal data center 516 to check special stamps data base 540 and identification card data base 541 (FIG. 9 to determine the identity of the person or group who was issued the special stamps or identification card. Postal data center 516 will inform meter 341 of the results of its determination. The results of the determination are described in the description of FIG. 9.

Figure 8:
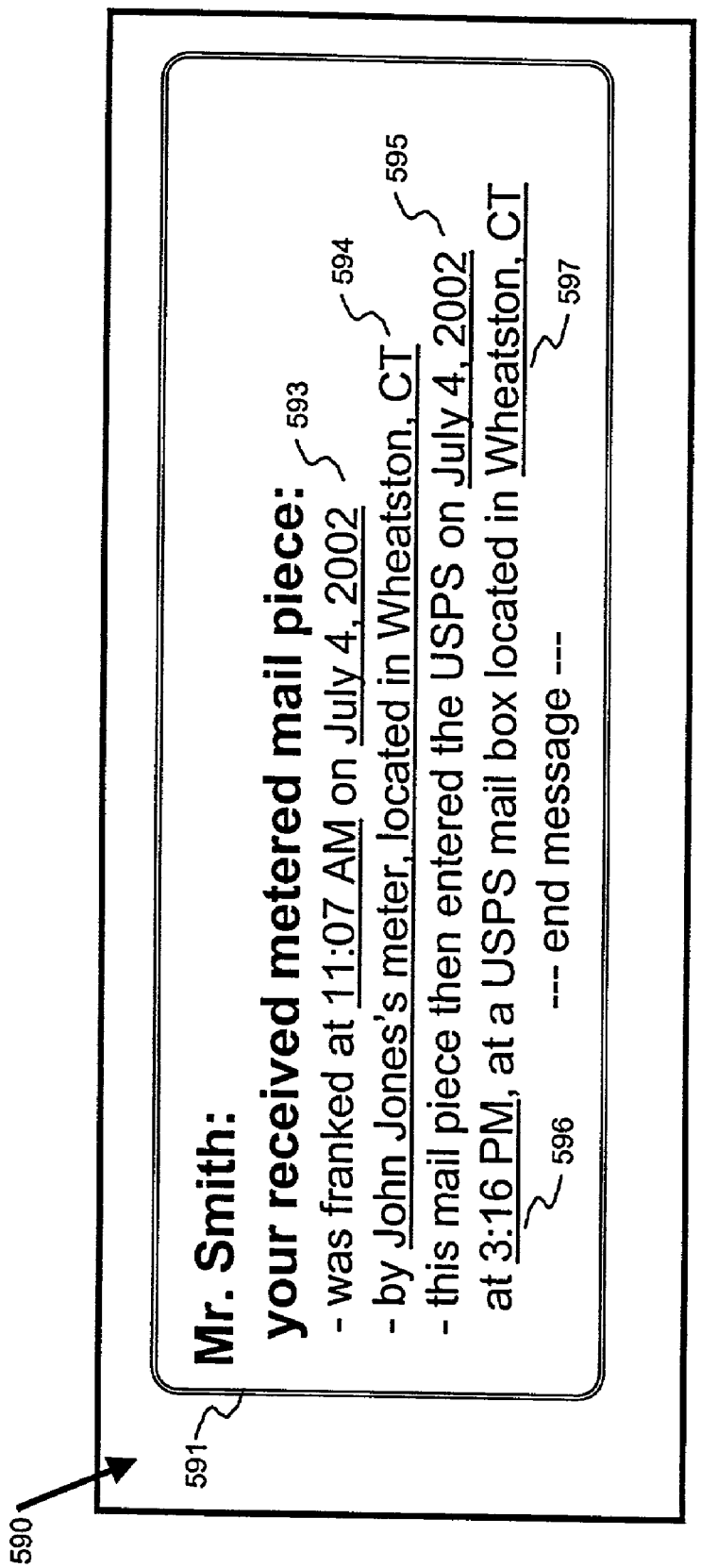
FIG. 8 is a drawing of a reply message from the data center to recipient's meter.

FIG. 8 is a drawing of a reply message from the data center 26 or 326 (FIGS. 1 and 8) to recipient's electronic meter 41, 11 or personal computer meter 341, 311. Information 591 from data centers 26 or 326 will be displayed on display 590. Display 590 is user I/O 47 or user I/O 17 (FIG. 1) or user I/O 347 or user I/O 31 (FIG. 7). Information 591 includes the date and time the mail was franked 593; the name and location of the licensee of the meter 594; the date 595 the mail was deposited in receptacle 500 (FIG. 2); the time 596 that the mail was deposited in receptacle 500; and, the location 597 of receptacle 500.

Figure 9:
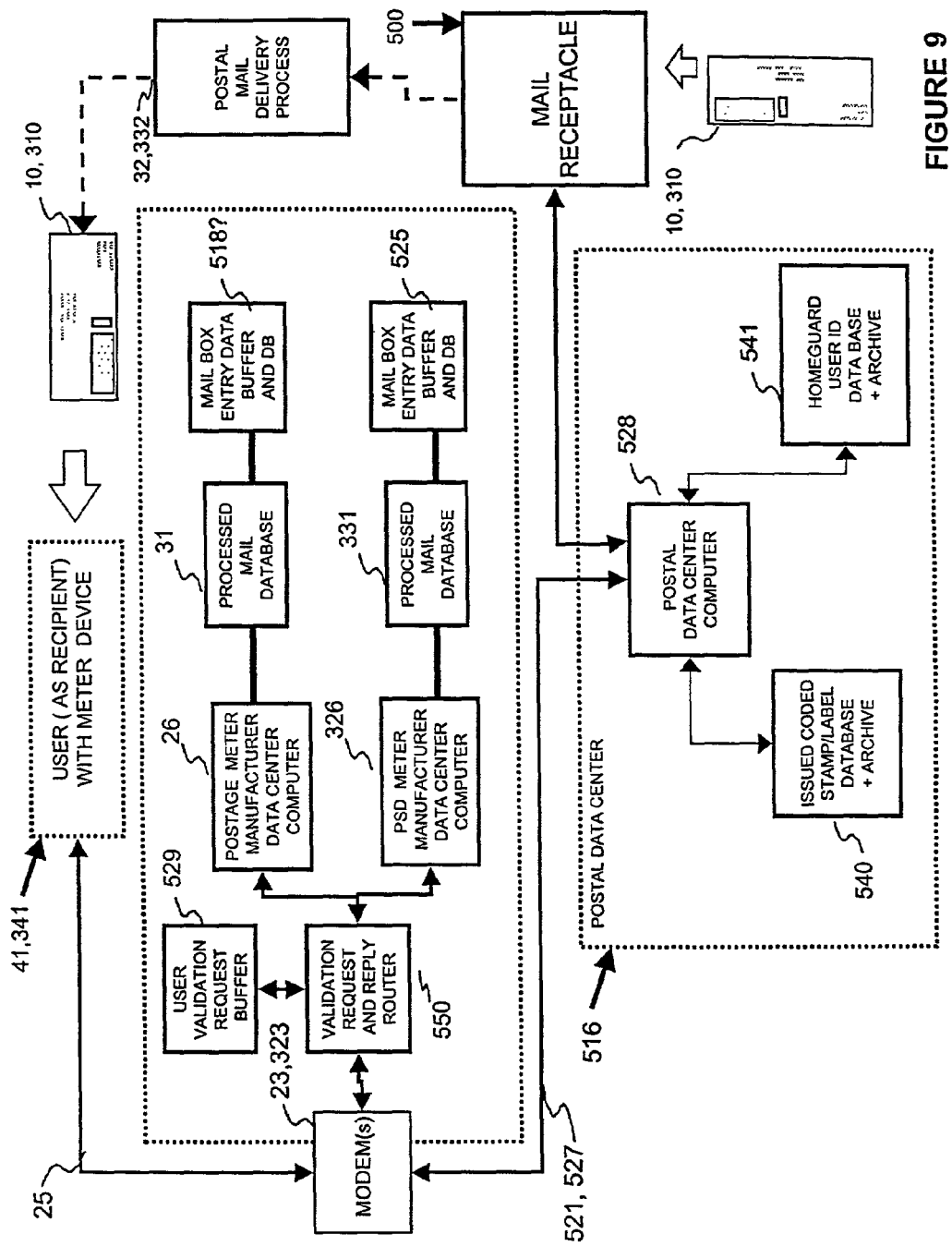
FIG. 9 is a drawing showing the validation of mail by meters 41 or 341.

FIG. 9 is a drawing showing the validation of mail by meters 41 or 341. After meter 41 or meter 341, respectively, scans mail piece 10 or 310 that was deposited in receptacle 500 and delivered by process 32 or 332, a message is sent to data center computer 26 or 326 via modem 23 or 323 requesting data center computer 26 or 326 to check the validity of the mail pieces. At this time validation request and reply router 550 buffers the user's request in user validation request buffer 529. Router 550 also interprets the request to decide if the mail is electronic metered mail, PSD metered mail, stamped or labeled mail that entered receptacle 500 (FIG. 2) or identification card mail that entered receptacle 500.

If router 550 determines that the mail is metered mail or PSD metered mail, computer 26 or computer 326 receives a buffered message from user validation request buffer 529. Computer 26 or 326 checks mail entry data buffer and database 518 or 525 to determine whether or not mail was processed by receptacle 500. Computer 26 or 326 also checks processed mail data base 31 or 331 to determine whether or not mail was processed by meter 41 or meter 341. Computer 26 or 326 displays the results of the above checks to meters 41 or 341 via router 550 and modems 23 or 323.

If router 550 determines that the mail is stamped or labeled mail or identification card mail, router 550 will send the request to postal data center 516 via modems 23 or 323 and transmission path 521 or 527. Postal data center computer 528 will check issued coded stamp/label data base archive 540 and home guard user identification data base and archive 541 to determine if the mail being validated was issued a stamp 100 or 110 (FIGS. 10A, 10B) that is archived in data base 540, or if the mail being validated was assigned to an identification card 600 or 610 (FIGS. 11A, 11B) archived in data base 541. Computer 528 will also receive information regarding mail that was deposited in receptacle 500.

Data base 540 stores the stamp special code 103 (FIG. 10A), label special code 110 (FIG. 10B) and the name of the person and/or entity who received stamp 100 or label 110. Data base 541 stores the special codes 601 and 611 (FIGS. 11A and 11B) and the name of the person and/or entity to whom cards 600 and 610 were issued. Postal data center computer 528 will inform meter 41 or 341 of the results of the above search. The results of a particular search are described in the description of FIG. 8.

Figure 10A:
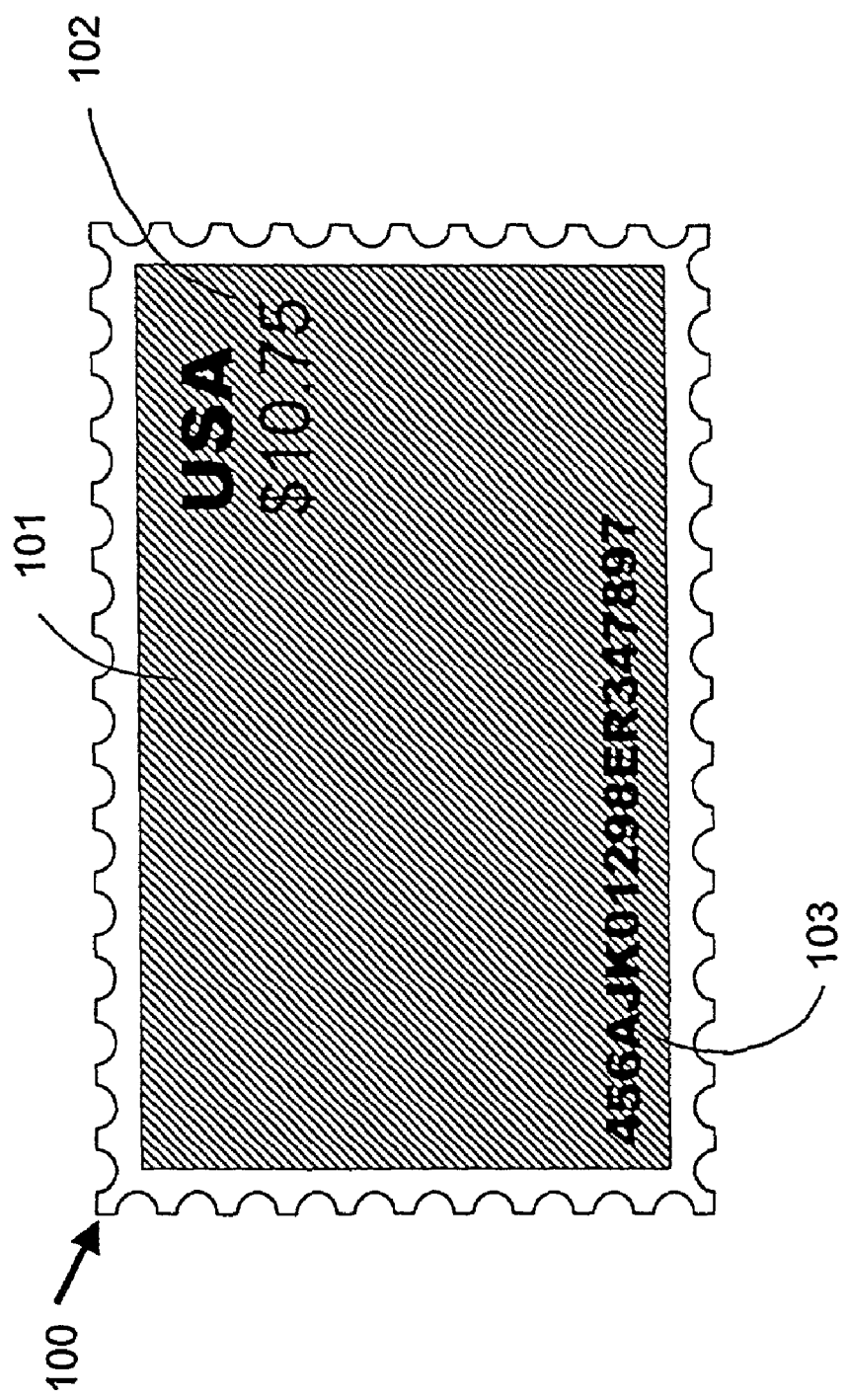
FIG. 10A is a drawing of a special postage stamp.

FIG. 10A is a drawing of a special postage stamp. Postage stamp 100 has a stamp graphics area 101 showing the graphic design and the stamp denomination 102. Stamp 100 also has a special code 103 comprised of a string of alphanumeric characters, which is readable by conventional optical character recognition readers. Special code 103 is unique in that each stamp will have a different code. Thus, when the USPS sells a stamp, special code 103 and the person or entity that purchased the stamp will be recorded and stored in archive 540 (FIG. 9).

Figure 10B:
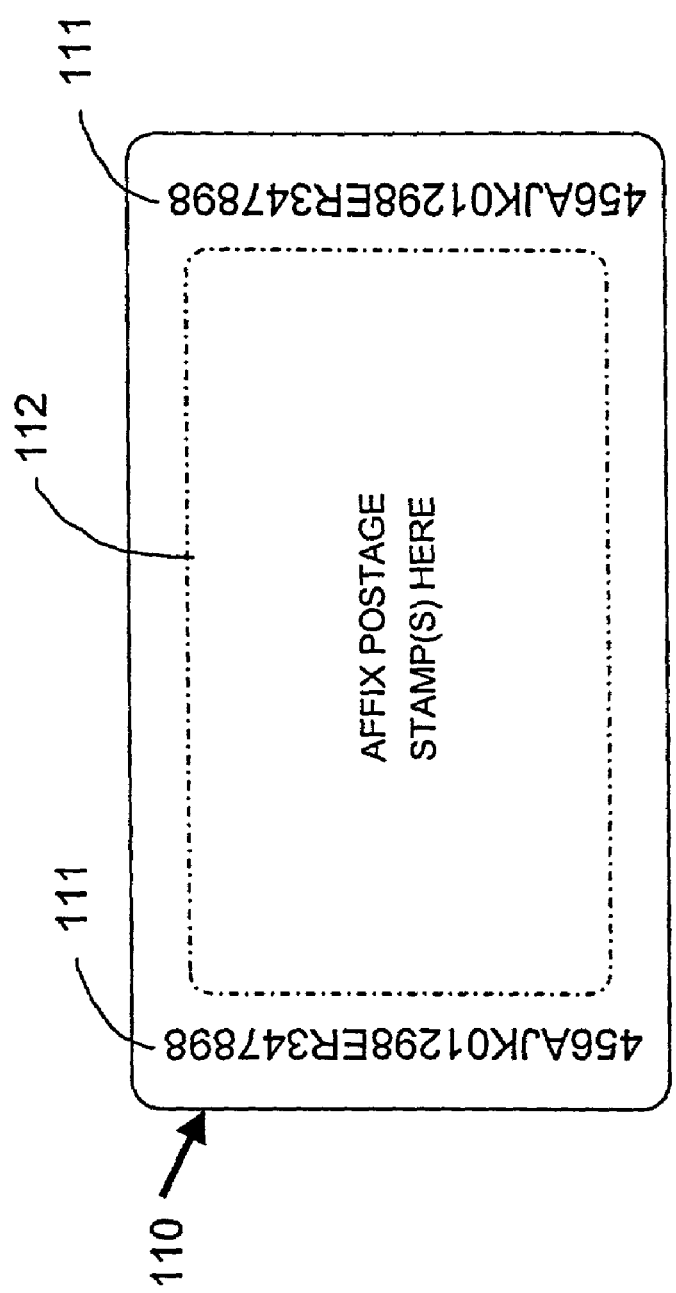
FIG. 10B is a drawing of a label that identifies an individual or a business entity.

FIG. 10B is a drawing of a label that identifies an individual or a business entity. Label 110 has an adhesive area (not shown) to allow the label to be affixed to mail. Label 110 also has a special code 111 comprised of a string of alphanumeric characters, which is readable by conventional optical character recognition readers. Special code 111 is unique in that each person or entity will have a different special code 111. Thus, when the USPS issues a label 110, the person or entity to whom or which that label 110 was issued, and their special code 111, will be recorded and stored in archive 540 (FIG. 9). A normal postage stamp may be affixed to area 112.

Figure 11A:
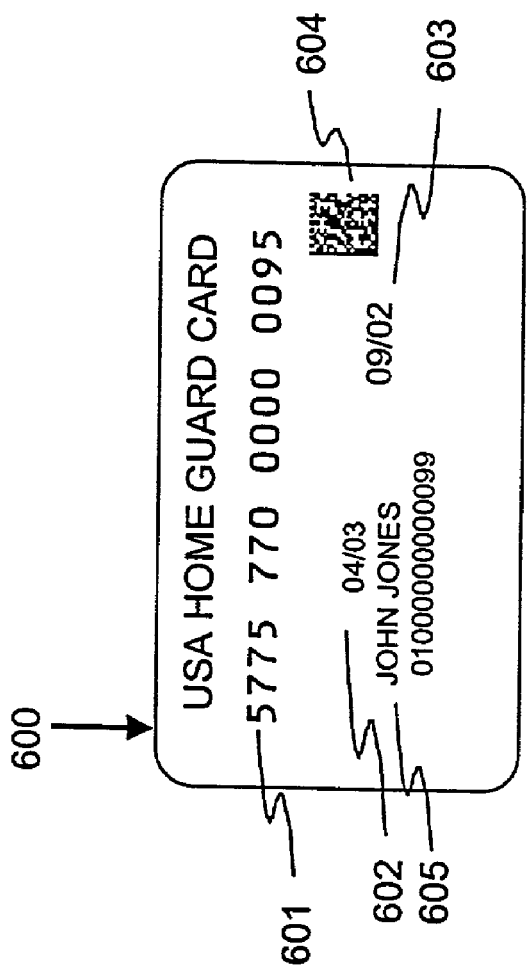
FIG. 11A is a drawing of an identification card issued to an individual.

FIG. 11A is a drawing of an identification card issued to an individual. Identification card 600 has a card number 601 and a name 605 to whom card 600 was issued. Number 601 is a special code comprised of a string of numeric characters, which is readable by conventional optical character recognition readers. Special code 601 is unique in that each individual will have a different code. Thus, when the USPS issues identification card 600, special code 601 and the person that card 600 was issued to will be recorded and stored in archive 541 (FIG. 9). Also, each time card 600 is placed in slot 507 of receptacle 500 (FIG. 2), that fact will be recorded in archive 541. Number 601 and/or name 605 may be represented by a two-dimensional bar code 604. Card 600 also has a date of issue 602 and expiration date 603. Information represented on card 600 may be read by scanner 511 (FIG. 2).

Figure 11B:
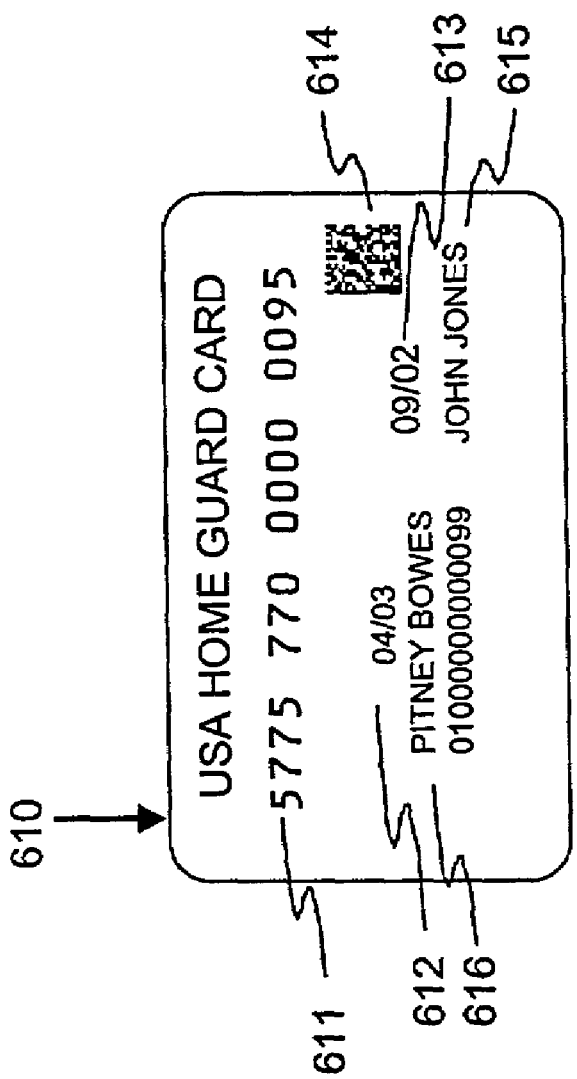
FIG. 11B is a drawing of an identification card issued to an entity.

FIG. 11B is a drawing of an identification card issued to an entity. Identification card 610 has a card number 611, an entity 616 to whom card 600 was issued, and the name of a person 615 in entity 616 who is allowed to use card 610. Number 611 is a special code comprised of a string of numeric characters, which is readable by conventional optical character recognition readers. Special code 611 is unique in that each individual will have a different code. Thus, when the USPS issues identification card 610, special code 611, entity 612 and the person that card 610 was issued to will be recorded and stored in archive 541 (FIG. 10). Also, each time card 610 is placed in slot 507 of receptacle 500 (FIG. 2), that fact will be recorded in archive 541. Number 611 and/or name 615 may be represented by a two dimensional bar code 614. Card 610 also has a date of issue 612 and expiration date 613. Information represented on card 600 may be read by scanner 511 (FIG. 2).

The above specification describes a new and improved system that allows the recipient of mail to know the identity of the mailer before the recipient opens the mail. It is realized that the above description may indicate to those skilled in the art additional ways in which the principles of this invention may be used without departing from the spirit. Therefore, it is intended that this invention be limited only by the scope of the appended claims.

What is claimed:

1. An incoming mail monitoring system, said system comprises: a data base that stores unique information contained in a Postal indicia affixed to mail;
   a plurality of recipient addressee units that reads and stores the unique information contained on the mail in the Postal indicia after the mail has been delivered to the recipient; and
   a data center that receives information stored by the data base and the recipient's units to identify the mailer to the recipient and assess the possibility of the presence of life-harming material in the mail.

2. The system claimed in claim 1, wherein the data base stores unique information contained in a postal indicia.

3. The system claimed in claim 2, further including a mailer's unit that communicates with the data base and stores in the data base the time and date that the postal indicia was affixed to the mail.

4. The system claimed in claim 2, wherein the data center correlates the recipient address of the mail with unique information contained in the postal indicia.

5. The system claimed in claim 1, wherein the data base stores a unique code contained in a stamp.

6. The system claimed in claim 1, wherein the data base stores a unique code contained in a label.

7. The system claimed in claim 1, wherein the recipient units include a scanner that reads postal indicia that is affixed to mail.

8. The system claimed in claim 7, wherein the scanner captures and interprets the information contained in the postal indicia.

9. The system claimed in claim 1, wherein the recipient units include a scanner that reads a unique code that is contained in a stamp that is affixed to mail.

10. The system claimed in claim 1, wherein the recipient units include a scanner that reads a unique code that is contained in a label that is affixed to mail.

11. The system claimed in claim 1, further including: a plurality of receptacles that reads, stores and communicates to the data center unique information appearing on mail.

12. The system claimed in claim 11, wherein the unique information appearing on mail is stored in the data base.

13. The system claimed in claim 12, wherein the scanner is located in a control chamber.

14. The system claimed in claim 12, wherein the control chamber has a locked door for isolating suspect mail.

15. The system claimed in claim 12, wherein the receptacle further comprises:
    an inner chamber that receives mail from the control chamber that is not suspected of having life harming material.

16. The system claimed in claim 12, wherein the inner chamber has a locked door in which when open mail may be removed from the inner chamber.

17. The system claimed in claim 12, further including a slot for depositing mail into the control chamber.

18. The system claimed in claim 8, further including: means for closing the slot when the mail in the control chamber is suspected of containing life harming substances.

19. The system claimed in claim 1, wherein the recipient's units comprise: electronic postage units.

20. The system claimed in claim 1, wherein the recipient's units comprise personal computer meters.

21. The system claimed in claim 1, wherein the unique information contained in the postal indicia is a security code.

22. The system claimed in claim 21, wherein the security code is obtained from a recipient address field on the mail and information contained in a postage meter that affixed the postal indicia to the mail.

* * * * *